United States Patent [19]

Takei et al.

[11] Patent Number: 5,411,334
[45] Date of Patent: May 2, 1995

[54] ROLLING GUIDE UNIT

[75] Inventors: Seiji Takei; Takehiko Hara, both of Kanagawa, Japan

[73] Assignee: Nippon Thompson Co., Ltd., Tokyo, Japan

[21] Appl. No.: 230,686

[22] Filed: Apr. 20, 1994

[30] Foreign Application Priority Data

Apr. 23, 1993 [JP] Japan ................................ 5-120531

[51] Int. Cl.6 .................... F16C 29/06; F16H 19/04
[52] U.S. Cl. .................................. 384/45; 74/89.17
[58] Field of Search ............ 384/43, 44, 45, 49, 384/451; 74/89.11, 89.12, 89.17, 89.18, 422

[56] References Cited

U.S. PATENT DOCUMENTS

| | | | |
|---|---|---|---|
| 4,557,532 | 12/1985 | Teramachi | 384/45 |
| 4,844,624 | 7/1989 | Teramachi | 384/45 |
| 4,932,276 | 6/1990 | Treadwell et al. | 74/89.17 X |
| 5,067,823 | 11/1991 | Kasuga | 384/45 |
| 5,186,545 | 2/1993 | Shirai | 384/43 |
| 5,326,197 | 7/1994 | Takei | 384/45 X |

FOREIGN PATENT DOCUMENTS

| | | | |
|---|---|---|---|
| 13223 | 1/1983 | Japan | 384/451 |
| 101914 | 5/1987 | Japan | . |
| 186028 | 8/1988 | Japan | . |

*Primary Examiner*—Thomas R. Hannon
*Attorney, Agent, or Firm*—Sughrue, Mion, Zinn, Macpeak & Seas; Richard C. Turner; Marc Kaufman

[57] ABSTRACT

A rolling guide unit in which the cross-section of a track rail is U-shaped wherein grinding processing of a track provided on the inside surface is facilitated. In addition, the thickness of the overall unit can be decreased by employing a self-traveling unit in which a motor is installed on a slider of a rolling guide unit. Grinding is facilitated by a split rail along one of the side walls of a track rail, and grinding can be performed with the split rail removed. In addition, since the entire outside surface of the side wall of the track rail can be used as a track for a rolling member, even if the track rail is flat, it is able to sufficiently transfer driving force, thereby allowing the thickness of the entire unit to be decreased.

8 Claims, 11 Drawing Sheets

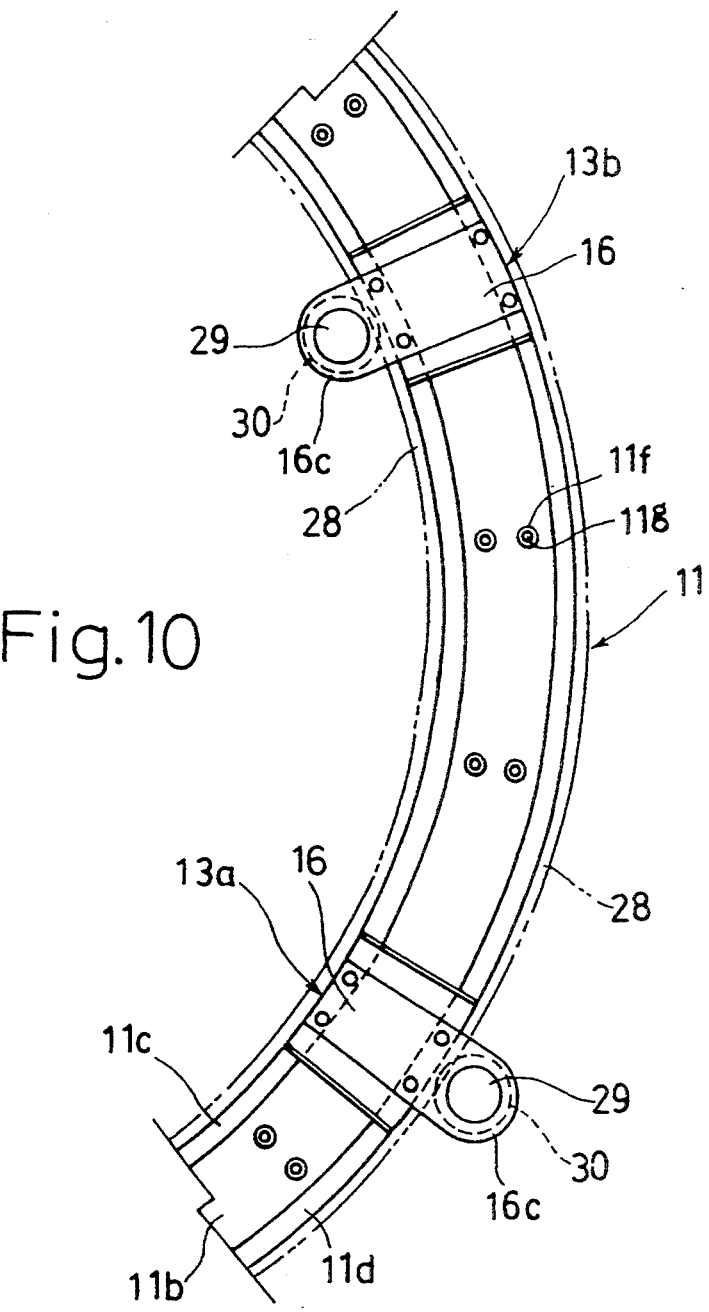

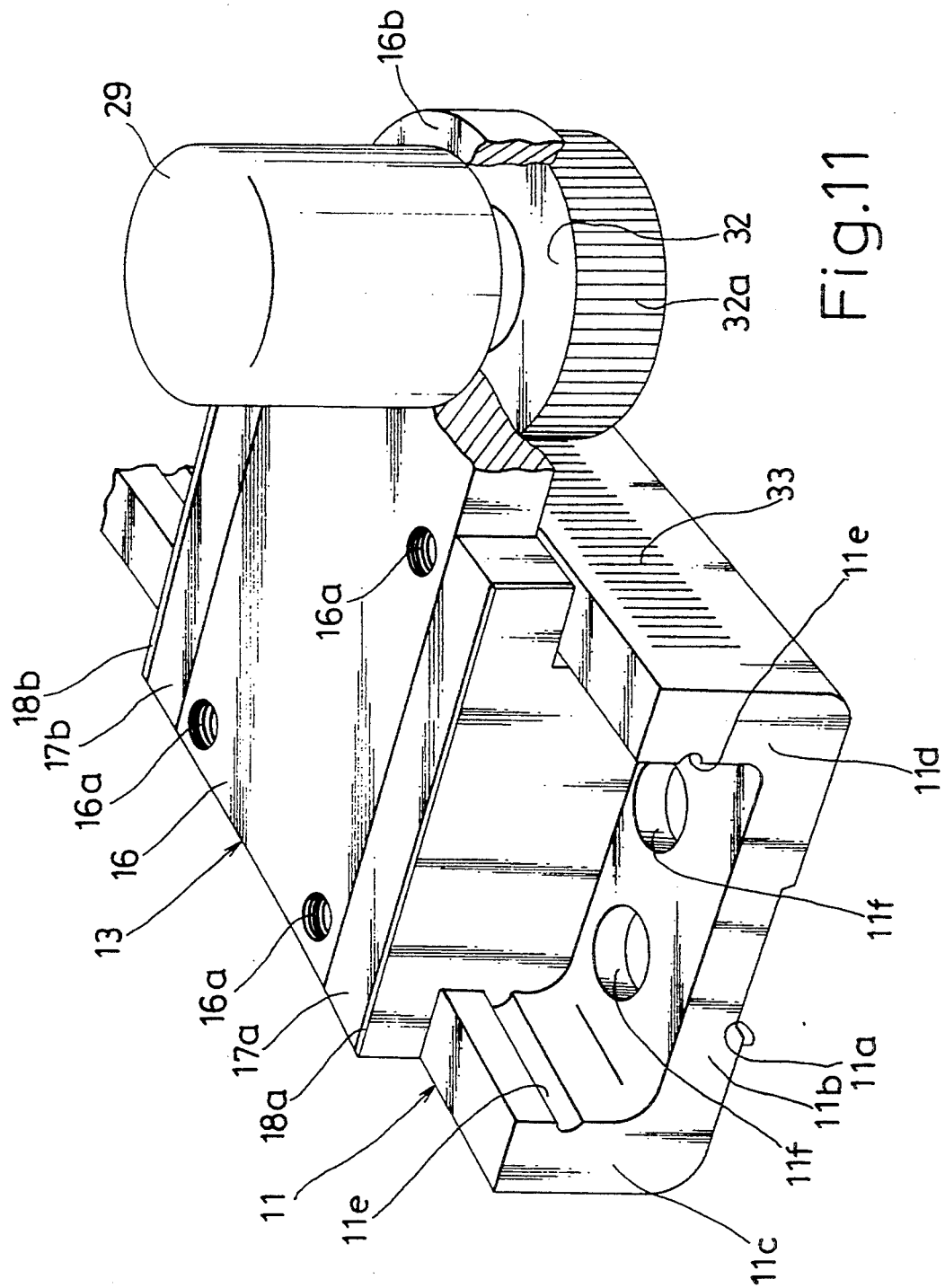

ROLLING GUIDE UNIT

BACKGROUND OF THE INVENTION

1. Field of the Invention

The present invention relates to a rolling guide unit that guides an object to be moved along a curvature, and which is equipped on, for example, a machine tool or industrial robot.

2. Description of the Prior Art

An example of this type of rolling guide unit of the prior art is shown in FIG. 1. Furthermore, although said rolling guide unit is disclosed in Japanese Patent Laid-Open Publication No. 63-186028, a similar construction is also disclosed in Japanese Patent Laid-Open Publication No. 62-101914.

As shown in FIG. 1, this rolling guide unit is equipped with track rail 1, in which one track each in the form of track groove 1a is formed on both the right and left sides along the lengthwise direction, slider 2 able to move relative to said track rail 1, and a plurality of rolling elements in the form of balls (not shown) arranged and contained within a rolling element circulating path (not shown) formed in said slider 2 that bear the load between track rail 1 and slider 2 by circulating while rolling over said track grooves 1a.

As shown in the drawing, track rail 1 has a constant curvature in the lengthwise direction, and slider 2 moves along this curvature. Furthermore, as is clear from the drawing, the cross-section of track rail 1 is of a roughly rectangular shape, while the cross-section of slider 2 is roughly U-shaped, with said slider 2 straddling this track rail 1.

The present invention provides a rolling guide unit having a construction as is described below that is basically different from the above-mentioned rolling guide unit of the prior art, the details of which are described later.

Namely, track rail 1 is equipped with a flat bottom and a pair of side walls in which tracks are formed in the inside surfaces that extend roughly perpendicular to said bottom from the right and left sides of said bottom, and has a cross-section roughly in the shape of the letter "U". A slider is inserted in said track rail so as to be sandwiched between both said side walls.

In the case of the rolling guide unit having said construction, since the tracks of the track rail are provided on the inside surfaces of the above-mentioned side walls, finishing processing in the form of grinding of said tracks cannot always be performed easily.

SUMMARY OF THE INVENTION

Therefore, a first object of the present invention is to facilitate easy grinding of the tracks in a rolling guide unit having the above-mentioned construction.

However, as is disclosed, for example, in Utility Model Laid-Open Publication No. 5-12750, a self-traveling rolling guide unit is known wherein a driving force generating device such as a motor is installed on a slider, and a pinion driven by this driving force generating device rolls along a rack formed in the side surface of a track rail to achieve a compact size. However, the disclosed rolling guide unit is of the linear type wherein the track rail is formed linearly.

A second object of the invention of the present application is to provide a rolling guide unit, that although is based on tile basic construction of the rolling guide unit described above, also employs this self-traveling construction to achieve an even greater reduction in size, and particularly, reduce the thickness of the overall unit.

In order to achieve the above-mentioned first object, the present invention is composed to be equipped with: a track rail, equipped with a pair of side walls extending roughly perpendicular to a bottom in which a mounting surface is formed from both sides of said bottom, and in which a track is formed in one of either inside surface along the lengthwise direction, and having a constant curvature in the lengthwise direction; a split rail arranged along the inside surface of the other side wall in which a track is formed in the inside surface along the lengthwise direction; a slider that is inserted so as to be sandwiched between one of said side walls and split rail, and which is able to move relative to said track rail and split rail, in which a rolling element circulating path is formed that includes load bearing tracks corresponding to each of said tracks; and, a plurality of rolling elements arranged and contained within said rolling element circulating path which bear the load by circulating while rolling over said tracks.

In addition, in order to achieve the above-mentioned second object, the present invention is composed to be equipped with: a track rail, equipped with a pair of side walls extending roughly perpendicular to a bottom in which a mounting surface is formed from both sides of said bottom, and in which a track is formed in each inside surface along the lengthwise direction, and having a constant curvature in the lengthwise direction; a slider inserted between said side walls that is able to move relative to said track rail, in which a rolling element circulating path is formed that includes load bearing tracks corresponding to each of said tracks; a plurality of rolling elements arranged and contained within said rolling element circulating path which bear the load by circulating while rolling over said tracks; a driving force generating device mounted on said slider; and, a rolling member that rolls by applying driving force from said driving force generating device.

BRIEF DESCRIPTION OF THE DRAWINGS

FIG. 10 is an overhead view of the essential portion of a third embodiment of the rolling guide unit of the present invention.

FIG. 11 is a perspective view, including a partial cross-section, of a portion of a fourth embodiment of the rolling guide unit of the present invention.

DESCRIPTION OF THE PREFERRED EMBODIMENTS

The following provides an explanation of the embodiments of the present invention with reference to the attached drawings.

Figure 2:
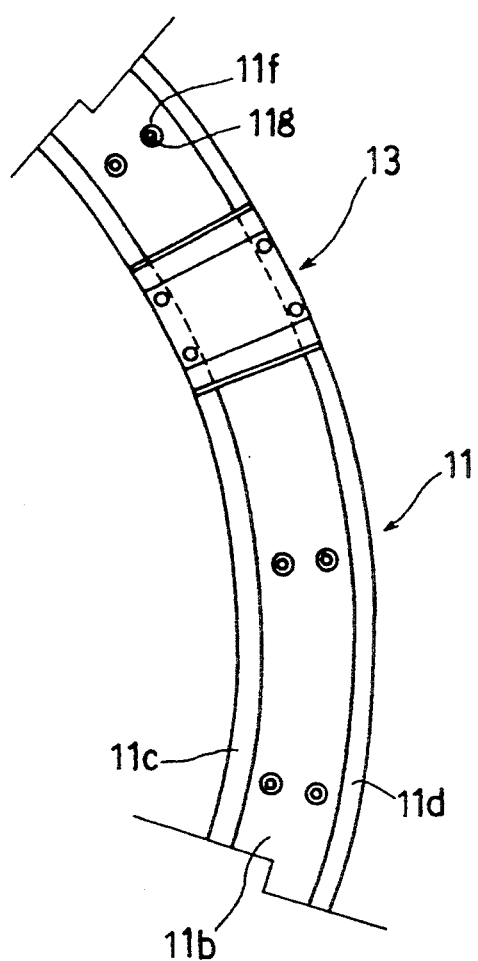
FIG. 2 is an overhead view of the essential portion of a rolling guide unit as claimed in the present invention.
Figure 3:
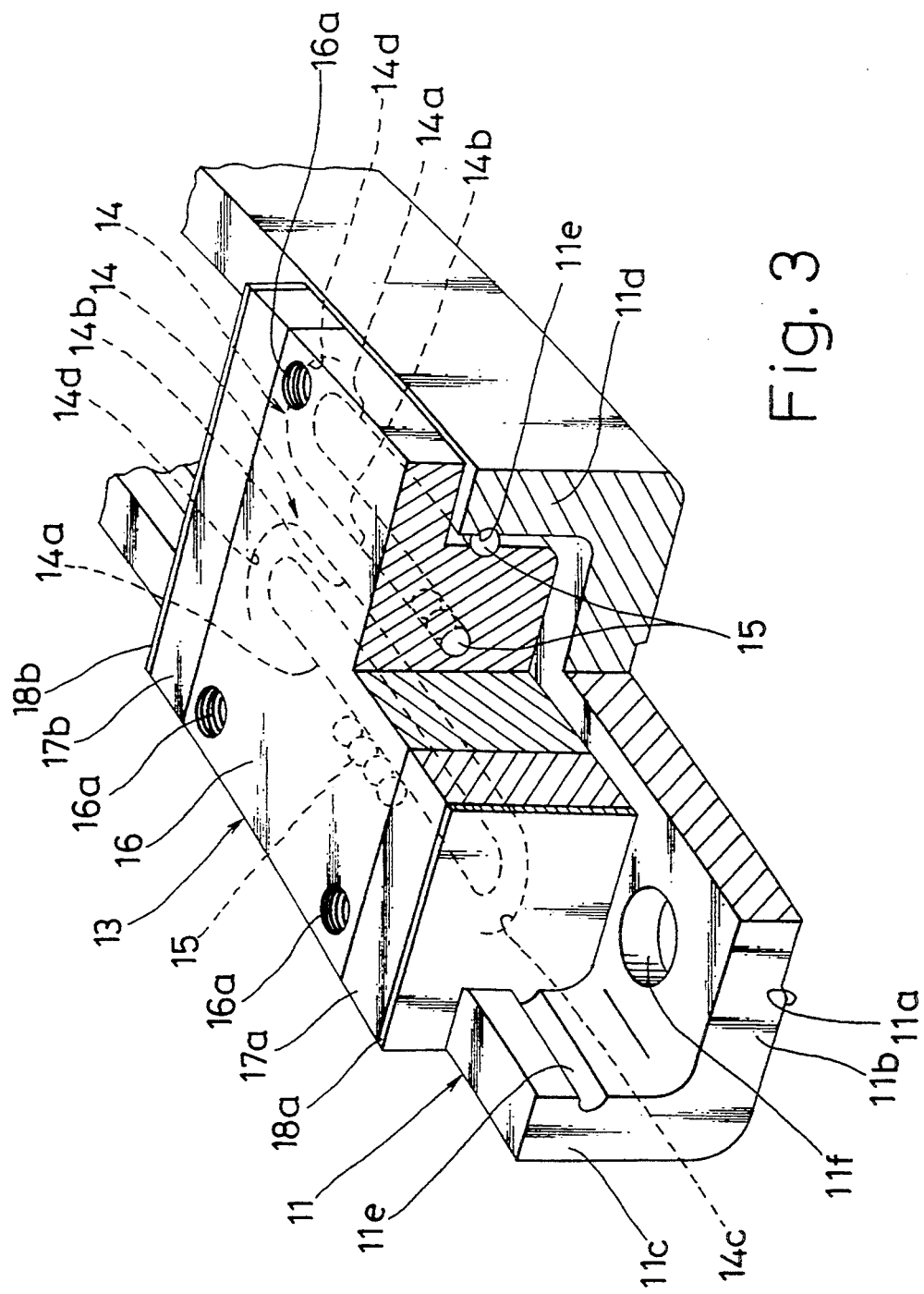
FIG. 3 is a perspective view, including a partial cross-section, of a portion of the rolling guide unit shown in FIG. 2.
Figure 4:
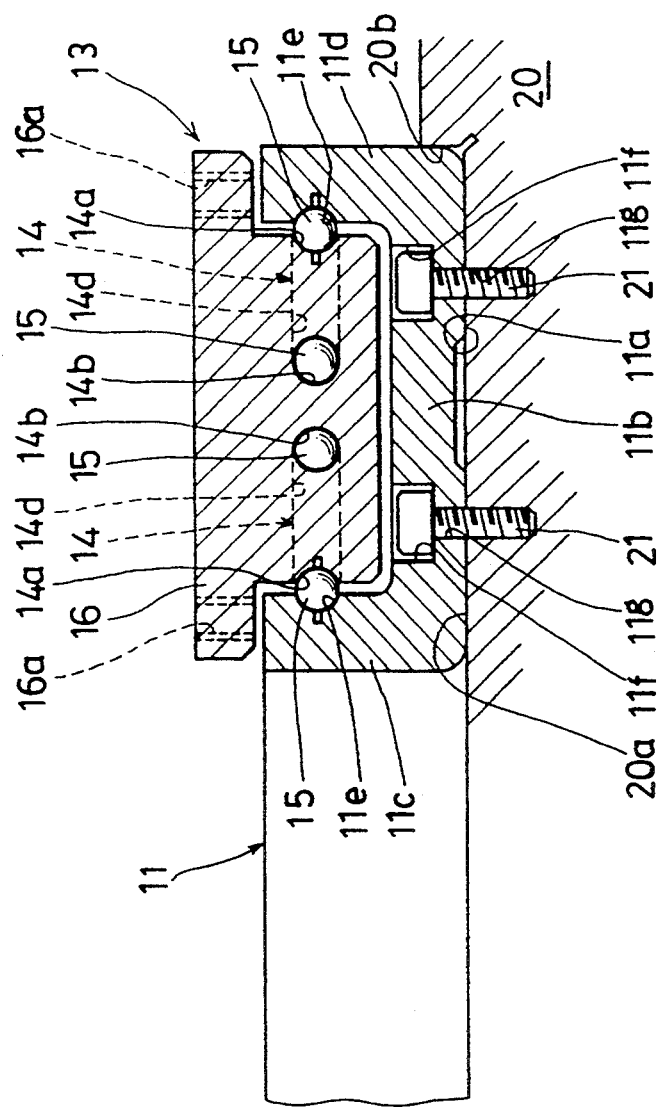
FIG. 4 is a longitudinal cross-sectional view of the rolling guide unit shown in FIG. 2.

To begin with, an explanation is provided regarding the basic construction of the rolling guide unit as claimed in the present invention based on FIGS. 2 through 4.

As shown in FIGS. 2 through 4, said rolling guide unit is equipped with track rail 11, having a constant curvature in the lengthwise direction, and a slider in the form of sliding unit 13 able to move relative to said track rail 11.

As is particularly clear from FIGS. 3 and 4, track rail 11 has a flat bottom 11b in which mounting surface 11a is formed, and a pair of side walls 11c and lid that extend perpendicular or roughly perpendicular to said bottom from both the left and right sides of said bottom 11b integrated into a single unit with said bottom 11b, and has a roughly U-shaped cross-section. One each of tracks in the form of track grooves lie formed along the lengthwise direction on the inside surfaces of both of said side walls 11c and 11d. Furthermore, a metal such as steel and so forth is selected for the material of track rail 11.

On the other hand, sliding unit 13 is inserted so that its roughly lower half is sandwiched between the above-mentioned side walls 11c and 11d, and rolling element circulating path 14 is provided in this inserted portion corresponding to both track grooves 11e of the above-mentioned track rail 11. A large number of rolling elements in the form of balls 15 are arranged and contained within said rolling element circulating path, and these balls 15 bear the load between track rail 11 and sliding unit 13 by circulating while rolling over the above-mentioned track grooves 11e accompanying movement of sliding unit 13.

In FIG. 3, sliding unit 13 has casing 16, formed from metal or synthetic resin, a pair of end caps 17a and 17b made of metal or synthetic resin and fastened to both the front and back ends of said casing 16 by screws and so forth (not shown), and seals 18a and 18b attached to the outer surfaces of both said end caps 17a and 17b. The above-mentioned rolling element circulating path 14 has load bearing tracks in tile form of load bearing track grooves 14a and return paths 14b formed linearly and mutually in parallel in casing 16, and a pair of roughly semi-circular return paths 14c and 14d formed in both end caps 17a and 17b, that connect said load bearing track grooves 14a and return paths 14b at both their ends. Furthermore, said load bearing track grooves 14a correspond with track grooves 11e of track rail 11.

However, as shown in FIG. 4, said rolling guide unit is arranged on flat mounting surface 20a formed on bed 20 of, for example, a machine tool, and track rail 11 is fastened to said bed 20 by a plurality of bolts (with hexagon sockets) 21. Furthermore, mounting preparation surface 20b is formed perpendicular to said mounting surface 20a in bed 20, said rolling guide unit is positioned by precisely aligning the side surface of track rail 11 with this mounting preparation surface 20b. In addition, the above-mentioned bolts 21 are inserted so as to be embedded in countersunk portions 11f and insertion holes 11g formed in bottom 11b of track rail 11, and do not protrude above the upper surface of bottom 11b. Although not shown in the drawings, flanges may be provided on the lower right and left sides of track rail 11, and bolts 21 may be inserted into the above-mentioned countersunk portions 11f and insertion holes 11g formed in these flanges as another construction for fastening track rail 11.

On the other hand, a table for holding a workpiece (not shown) is bolted to sliding unit 13, and this operates as the moving side. As is also shown in FIG. 3, for example, four threaded holes 16a are formed in the upper surface of casing 16 of sliding unit 13, and said table is fastened to sliding unit 13 by bolts (not shown) which are screwed into these threaded holes 16a.

Furthermore, although balls 15 are used for the rolling elements in said rolling guide unit, a construction may also be employed such as a cross roller type in which rollers are used.

Figure 5:
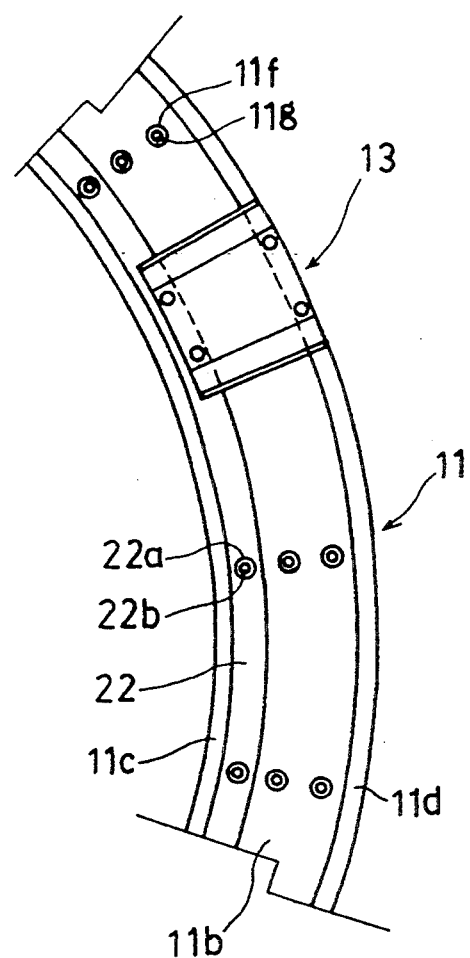
FIG. 5 is an overhead view of the essential portion of a first embodiment of the rolling guide unit of the present invention.
Figure 6:
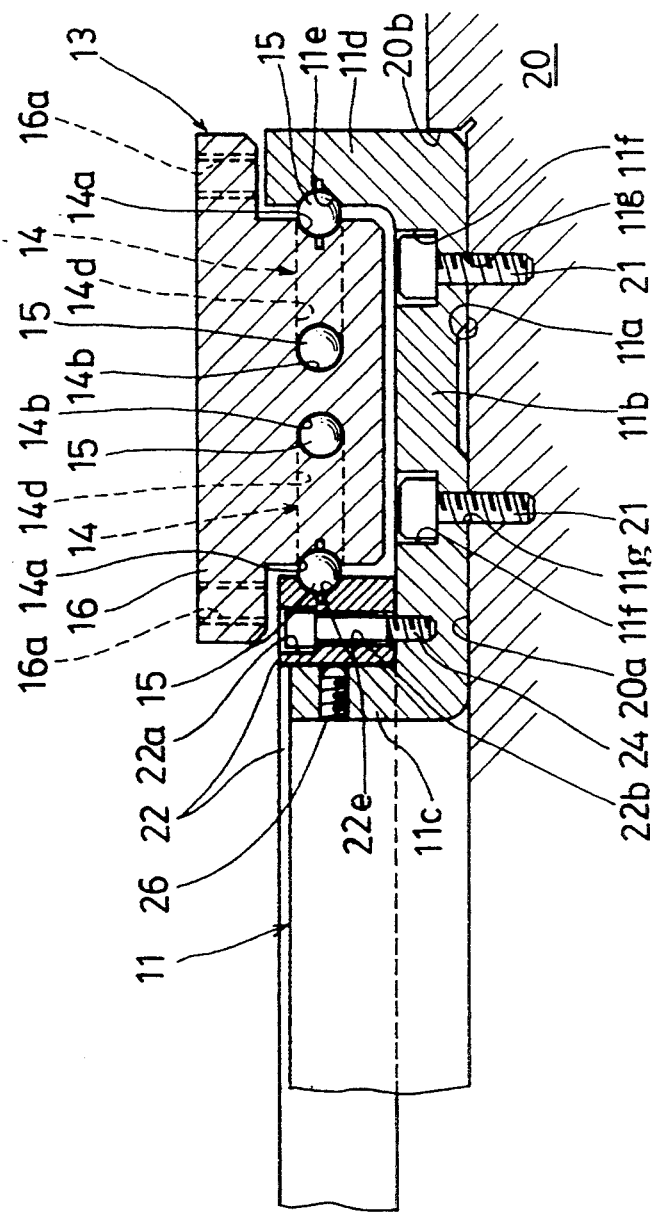
FIG. 6 is a longitudinal cross-sectional view of the rolling guide unit shown in FIG. 5.

Next, an explanation is provided regarding a first embodiment of the rolling guide unit of the present invention based on FIGS. 5 and 6. Furthermore, since the rolling guide unit of the present embodiment has the basic construction shown in FIGS. 2 through 4 with the exception of those portions explained below, an explanation of the overall unit is omitted, and the explanation only focuses on the essential portion. In addition, in the explanation below, the same reference numerals are used for those constituent members that are identical to or correspond with the constituent members shown in FIGS. 2 through 4. In addition, this applies similarly in the explanations of other embodiments provided later.

As shown in FIG. 6, in said rolling guide unit, track groove 11e is only formed in, for example, the outside side wall 11d among the pair of right and left side walls 11c and 11d of track rail 11, and there is no track groove formed in inside side wall 11c. As is also shown in FIG. 5, an additional split rail 22, having the same curvature and roughly the same length as track rail 11, is arranged along the inside surface of inside side wall 11c. Sliding unit 13 is inserted so as to be sandwiched between this split rail 22 and outside side wall 11d, and is able to move freely with respect to both track rail 11 and split rail 22.

As is clear from FIG. 6, the cross-section of the above-mentioned split rail 22 is, for example, rectangular in shape, and is fastened to bottom 11b of track rail 11 by a plurality of bolts 24 arranged in a row in its lengthwise direction. Furthermore, these bolts 24 are inserted so as to be embedded in countersunk portions 22a and insertion holes 22b formed in split rail 22, and do not protrude from the upper surface of split rail 22. In addition, split rail 22 itself protrudes slightly above tile upper edge of side wall 11c adjacent to it.

As shown in FIG. 6, track groove 22e, having the same shape as track groove 11e provided in outside side wall 11d of track rail 11, is formed along the lengthwise direction in the inside surface of the above-mentioned split rail 22. This track groove 22e corresponds to load bearing track groove 14a of rolling element circulating path 14 provided in sliding unit 13, and each of balls 15 arranged and contained within said rolling element circulating path 14 circulates while rolling over this track groove 22e accompanying movement of sliding unit 13.

In said construction, in the state wherein split rail 22 is still not installed on track rail 11, the distance between both side walls 11c and 11d is large. Thus, it is easy to insert a rotary grindstone for grinding track rail 11e in the inside surface of side wall 11d, and operation of said grindstone can be performed without restriction, thereby facilitating ease of grinding processing.

In addition, grinding of track groove 22e of split rail 22 can also be performed easily if grinding processing is performed before installing said split rail 22 in track rail 11.

However, as shown in FIG. 6, adjustment screw 26 is screwed into side wall 11c provided with the above-mentioned split rail 22 so as to pass through the inside and outside of said side wall 11c, and its end makes contact with the inside surface of split rail 22.

On the other hand, as is clear from FIG. 5, since the hole sizes of countersunk portions 22a and insertion holes 22b formed in split rail 22 for insertion of bolts 24 which fasten said split rail 22 to track rail 11 are somewhat larger than the diameter of said bolts, split rail 22 can freely approach or move away from side wall 11c in the state in which bolts 24 are loosened. Namely, by suitably moving split rail 22 by manipulating the above-mentioned adjustment screw 26 in the state in which bolts 24 are loosened slightly, the pressure can be adjusted between bails 15, track grooves 11e and 22e sandwiched around them, and load bearing track grooves 14a. However, once adjustment of pressure is completed, bolts 24 are securely tightened to fix split rail 22 in place.

Furthermore, although split rail 22 is arranged along inside side wall 22c in the present embodiment, it may also be provided along the inside surface of outside side wall 22d.

Figure 7:
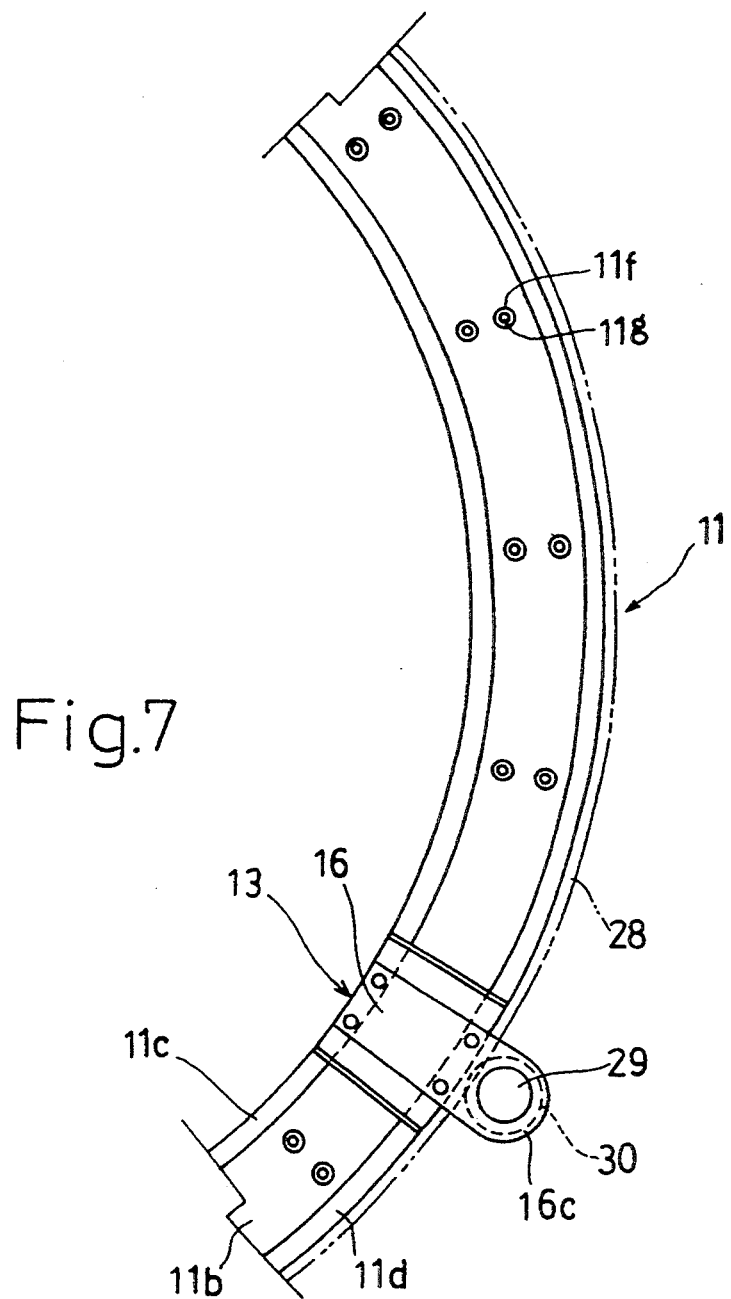
FIG. 7 is an overhead view of the essential portion of a second embodiment of the rolling guide unit of the present invention.
Figure 8:
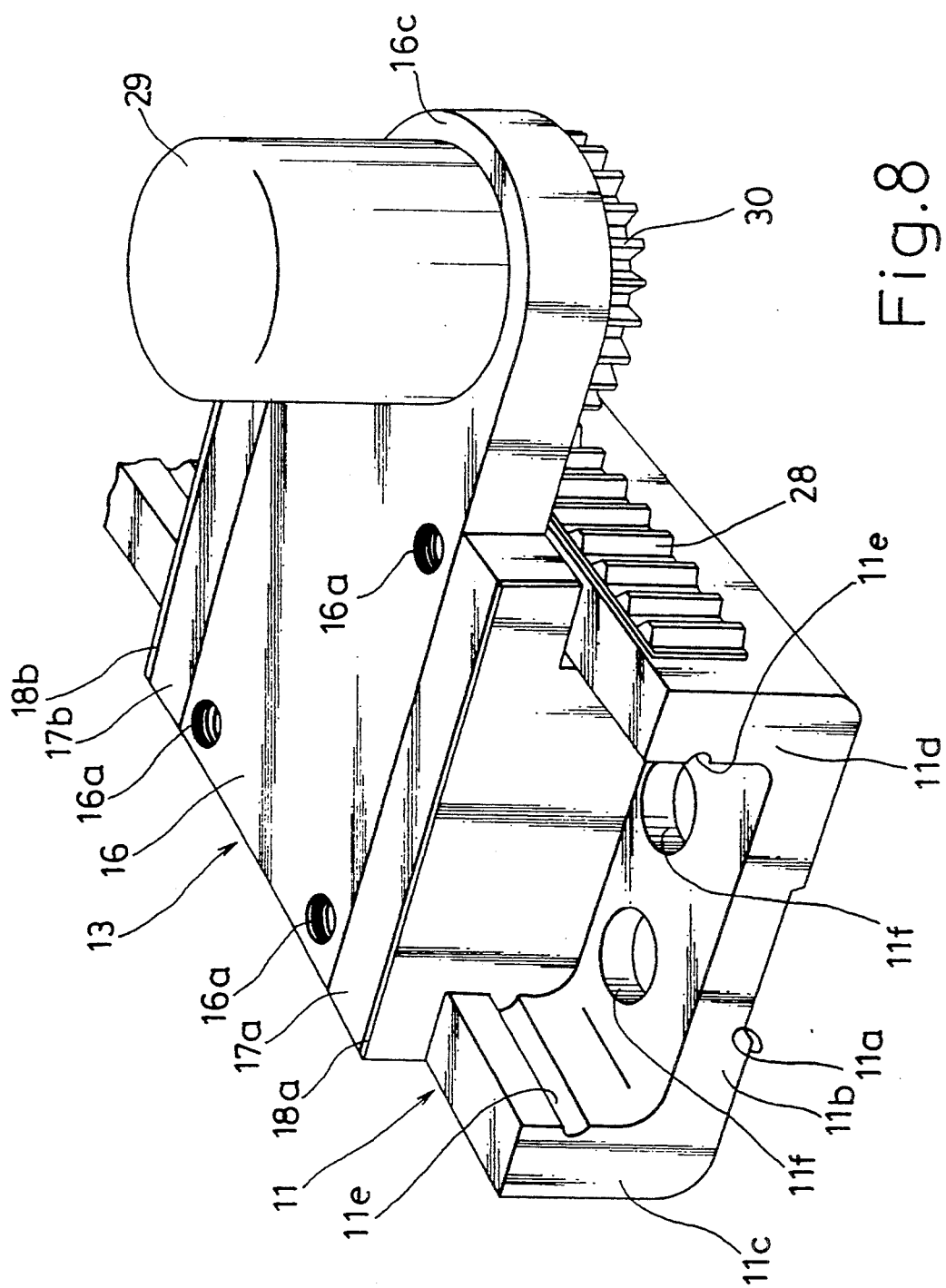
FIG. 8 is a perspective view of a portion of the rolling guide unit shown in FIG. 7.
Figure 9:
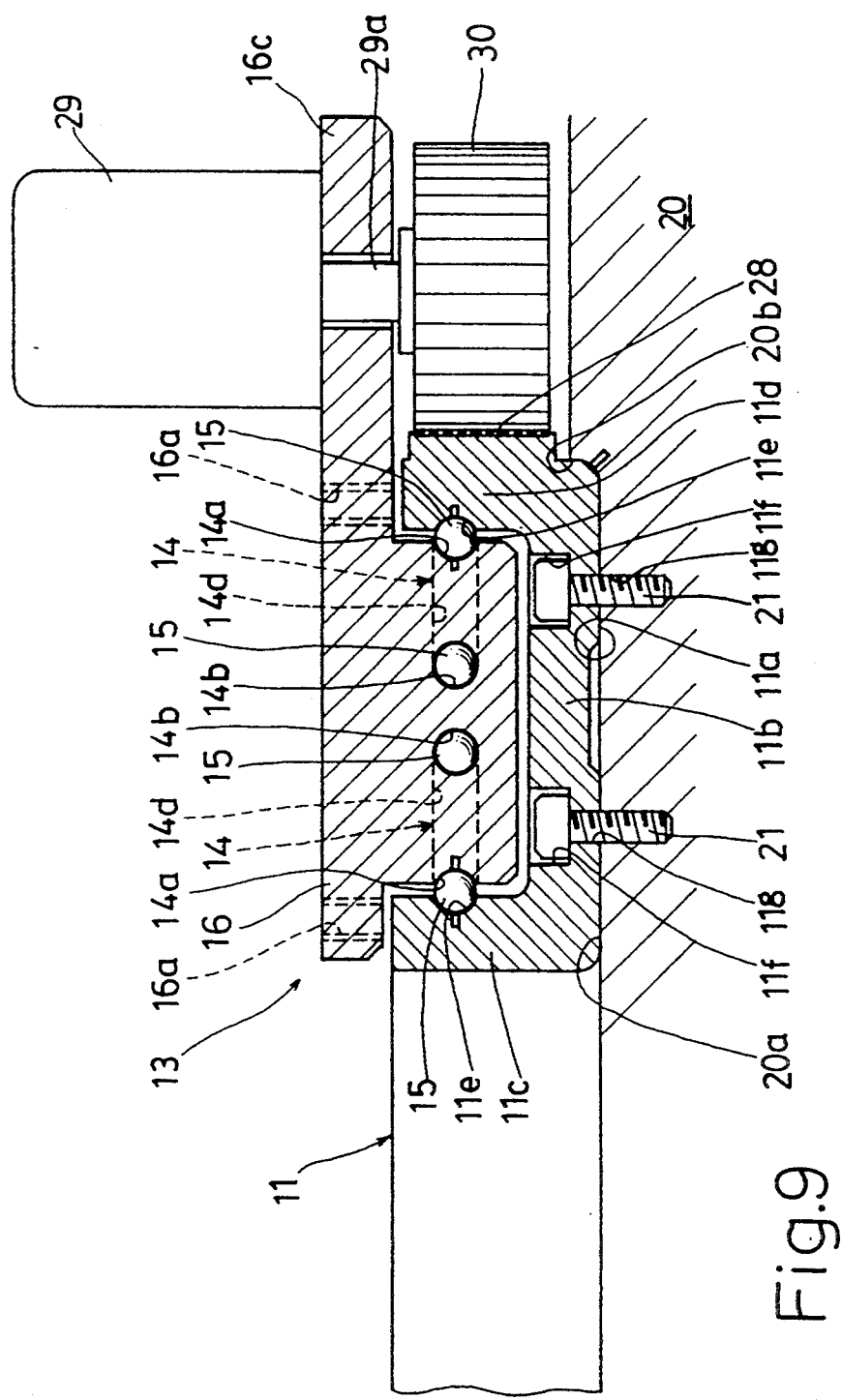
FIG. 9 is a longitudinal cross-sectional view of the rolling guide unit shown in FIG. 7.

Next, the following provides an explanation of a second embodiment of the rolling guide unit of the present invention based on FIGS. 7 through 9.

As shown in the drawings, in said rolling guide unit, rack 28 is formed integrated into a single structure with outside side wall 11d of track rail 11 along the lengthwise direction of its outside surface.

On the other hand, overhang 16c that protrudes towards the outside is formed integrated into a single unit with casing 16 of sliding unit 13, and a driving force generating device in the form of motor 29 is mounted on said overhang 16c with its output shaft 29a facing downward. A rolling member in the form of pinion 30 is fit onto said output shaft 29a, which meshes with the above-mentioned rack 28.

Namely, said rolling guide unit is of the self-traveling type, wherein pinion 30 rolls while meshing with rack 28 as a result of being rotated and driven by motor 29, resulting in movement of sliding unit 13.

Furthermore, although the case is shown in which the driving force generating device is motor 29 in said rolling guide unit, various other driving force generating devices can be applied, including the combination of a motor and speed reducing mechanism.

In addition, although pinion 30 is directly attached to output shaft 29a of motor 29 in the present embodiment, a construction may also be employed in which pinion 30 is attached to casing 16, and a speed reducing mechanism is juxtaposed between said pinion and motor 29.

In addition, although rack 28 is formed in outside side wall 11d of track rail 11 in the present embodiment, it may also be provided in inside side wall 11c.

Moreover, although an example of moving a single sliding unit on a track rail is shown in the present embodiment, a plurality of sliding units 13 may be provided, and these may be operated individually.

In the rolling guide unit having the construction described above, although compact size is achieved as a result of making it a self-traveling type, by also employing the basic construction shown in FIGS. 2 through 4, said rolling guide unit can be made even more compact, with the thickness of the overall unit in particular being able to be decreased.

This being the case, in said rolling guide unit, since the cross-section of track rail 11 is roughly in the shape of the letter "U", and track grooves 1e are provided on the inside surfaces of its side walls 11c and 11d, the entire outside surface of side wall 11d can be used for the space to be occupied by rack 28. Thus, even if the entirety of track rail 11 is flat, since rack 28 is provided over roughly the entire outside surface of side wall 11d and a sufficient width is secured for its teeth, the thickness of the entire unit can be decreased.

Figure 1:
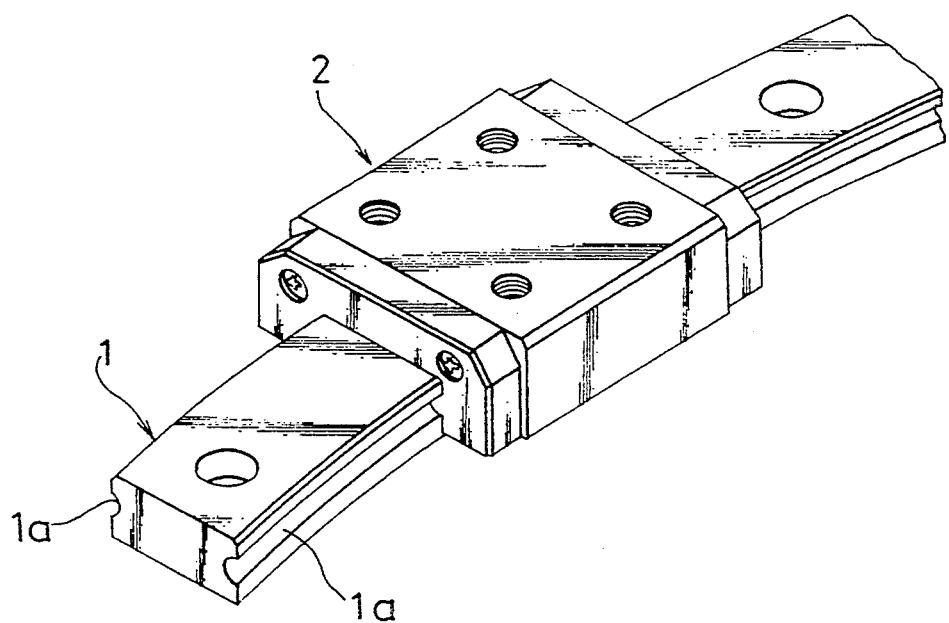
FIG. 1 is a perspective view of the essential portion of a rolling guide unit of the prior art.

Incidentally, in the rolling guide unit having the construction shown in FIG. 1, since track groove 1a is provided on the side of track rail 1 on which a rack is to be provided, in order to secure sufficient width for the rack teeth to allow transmission of the required motive power, the height of track rail 1 must be made correspondingly larger thus resulting in increased size of the overall unit.

FIG. 10 shows a third embodiment of the rolling guide unit of the present invention. In contrast to rack 28 being formed on only one of either side wall 11c and 11d on both sides of track rail 11 in the rolling guide unit of the second embodiment described above, in said rolling guide unit, rack 28 is formed on both side walls 11c and 11d.

In addition, a plurality, in this case two, of sliding units 13a and 13b are arranged on track rail 11. Pinion 30 equipped on one sliding unit 13a meshes with outside rack 28, while pinion 30 equipped on the other sliding unit 13b meshes with inside rack 28. In said construction, overhang 16c for holding motor 29 formed on casing 16 equipped on sliding units 13a and 13b is able to be detached from the main body of said casing 16 and its orientation when attached can be altered to the left and right, thus allowing a single type of sliding unit to be able to be applied to both inside and outside racks 28.

FIG. 11 shows the essential portion of a fourth embodiment of the rolling guide unit of the present invention.

As shown in the drawing, in said rolling guide unit, roller 32 is fit onto the output shaft of motor 29 in the form of a rolling member, and knurlings 32a are formed in the outside surface of said roller 32. In addition, knurlings 33 are also formed in the outside surface of side wall 11d of track rail 11 over which said roller 32 rolls over roughly the entire length of said side wall 11d. These knurlings 32a and 33 are flat, and lie in parallel with the axis of rotation of roller 32. As a result of providing these knurlings 32a and 33, the frictional force between said roller 32 and side wall 11d is increased during rolling of roller 32 along side wall 11d, thereby resulting in increased thrust.

Furthermore, although knurlings are formed in both roller 32 and side wall 11d in the present embodiment, knurlings may also be formed in only one of the above. In addition, although the knurlings shown in the present embodiment are flat, these may be changed to crossed or other types of knurlings, and other surface irregularities may also be formed other than knurlings.

In addition to the above-mentioned construction which forms knurlings, each of the following constructions can also be employed.

First, the outside surface of roller 32 and the outside surface of side wall 11d are simply in the form of smooth surfaces and both surfaces make direct contact with each other in the manner of a so-called friction drive system.

Next, an elastic member having a high coefficient of friction such as rubber is adhered to at least one of the mutually joining surfaces of either roller 32 or side wall 11d to increase the coefficient of friction between both.

Finally, a construction can be employed wherein a constant amount of oil is continuously supplied between the above-mentioned roller 32 and side wall 11d. In this construction, an oil film (not shown) is formed between roller 32 and side wall 11d. Consequently, sliding unit 13 is propelled by the resistance force, namely traction, that results during shearing of this oil film by the rotation of roller 32.

Furthermore, the present invention is not limited to the constructions of each of the above-mentioned embodiments, but naturally can realize a diverse range of constructions by suitably combining two or more of the above-mentioned embodiments either wholly or partially.

As has been explained above, in the rolling guide unit according to the present invention, a track is formed only on the inside surface of one of a pair of side walls possessed by a track rail, while a track is formed on the inside surface of a split rail arranged along the other side wall.

As a result of having said construction, since the distance between both side walls in the state in which the above-mentioned split rail is not yet installed on the track rail is large, a rotary grindstone can be easily inserted for grinding the track of one of the side walls. Moreover, since the operation of said grindstone can be performed without restriction, grinding processing can be performed easily. In addition, grinding of a track groove of a split rail can also be performed easily if grinding processing is performed before installing said split rail on the track rail, thus offering a first advantage of the present invention.

In addition, in said rolling guide unit according to the present invention, since the cross-section of a track rail is roughly in the shape of the letter "U", and tracks are formed on the inside surfaces of its side walls, the entire outside surface of said side wall can be used for the track of a rolling member which is rotated and driven by a driving force generating device. Consequently, even if the entirety of the track rail is flat, since it is possible to sufficiently transfer driving force, the entire unit can be made smaller, and the thickness in particular can be decreased, thus offering a second advantage of the present invention.

What is claimed is:

1. A rolling guide unit comprising:
a track rail, equipped with a pair of side walls extending roughly perpendicular to a bottom in which a mounting surface is formed, said side walls extending from both sides of said bottom respectively, and in which a track is formed in one of either inside surface along the lengthwise direction, and having a constant curvature in the lengthwise direction; an additional rail arranged along the inside surface of the other outside wall in which a track is formed in the inside surface along the lengthwise direction; a slider that is inserted so as to be sandwiched between one of said side walls and said additional rail, and which is able to move relative to said track rail and said additional rail, in which a rolling element circulating path is formed that includes load bearing tracks corresponding to each of said tracks; and, a plurality of rolling elements arranged and contained within said rolling element circulating path which bear the load by circulating while rolling over said tracks.

2. The rolling guide unit as set forth in claim 1 wherein said additional rail is able to approach and move away from said side wall, and has a pressure adjustment device which moves said additional rail to adjust the pressure between said tracks, load bearing tracks and rolling elements.

3. A rolling guide unit equipped with: a track rail, equipped with a pair of side walls extending roughly perpendicular to a bottom in which a mounting surface is formed from both sides of said bottom, and in which a track is formed in each inside surface along the lengthwise direction, and having a constant curvature in the lengthwise direction; a slider inserted between said side walls that is able to move relative to said track rail, in which a rolling element circulating path is formed that includes load bearing tracks corresponding to each of said tracks; a plurality of rolling elements arranged and contained within said rolling element circulating path which bear the load by circulating while rolling over said tracks; a driving force generating device mounted oil said slider; and, a rolling member that rolls by applying driving force from said driving force generating device.

4. The rolling guide unit as set forth in claim 3 wherein a rack is formed along the lengthwise direction in at least one of either of the outside surfaces of each of said side walls, and said rolling member is a pinion that meshes with said rack.

5. The rolling guide unit as set forth in claim 3 wherein an oil film is formed between said track rail and rolling member.

6. The rolling guide unit as set forth in claim 3 wherein said rolling member makes contact with said track rail.

7. The rolling guide unit as set forth in claim 6 wherein knurlings are formed in at least one of the joining surfaces of said track rail and rolling member with respect to the other joining surface.

8. The rolling guide unit as set forth in claim 6 wherein an elastic member having a high coefficient of friction is adhered to at least one of the joining surfaces of said track rail and rolling member with respect to the other joining surface.

* * * * *